United States Patent [19]
Klaus et al.

[11] Patent Number: 5,123,398
[45] Date of Patent: Jun. 23, 1992

[54] CARBURETION SYSTEM

[75] Inventors: Rudolph W. Klaus, Montague; James L. Knowlton, Whitehall, both of Mich.

[73] Assignee: Sunotyx Incorporated, Muskegon, Mich.

[21] Appl. No.: 780,473

[22] Filed: Oct. 22, 1991

[51] Int. Cl.$^5$ .............................................. F02M 31/00
[52] U.S. Cl. ................................. 123/543; 123/545; 123/546; 123/547; 261/144; 261/84; 261/DIG. 83
[58] Field of Search ............... 123/543, 545, 546, 547; 261/144, 145, 84, DIG. 83

[56] References Cited

U.S. PATENT DOCUMENTS

| | | | |
|---|---|---|---|
| 504,723 | 9/1893 | Gray | |
| 1,311,532 | 7/1919 | Schmid | 123/553 |
| 1,627,671 | 5/1927 | Shore | 123/553 |
| 3,667,436 | 6/1972 | Reichhelm | 123/119 |
| 4,187,264 | 2/1980 | Diener | 261/84 |
| 4,224,904 | 9/1980 | Clerk | 261/145 |
| 4,336,783 | 6/1982 | Henson | 123/546 |
| 4,348,338 | 9/1982 | Martinez et al. | 123/546 |
| 4,368,163 | 1/1983 | Covey | 261/144 |
| 4,438,750 | 3/1984 | Sviridov et al. | 123/557 |
| 4,538,583 | 9/1985 | Earl | 123/557 |
| 4,637,365 | 1/1987 | Yunick | 123/545 |
| 4,833,040 | 11/1989 | Rocky | 123/545 |
| 4,870,249 | 9/1989 | Kayanuma et al. | 219/205 |

OTHER PUBLICATIONS

Secrets of the 200 MPG Carburetor, Revised Edition, Jun. 1984.
Secrets of '17' Super Mileage Carburetors, May 1984.

*Primary Examiner*—Andrew M. Dolinar
*Assistant Examiner*—M. Macy
*Attorney, Agent, or Firm*—Price, Heneveld, Cooper, DeWitt & Litton

[57] ABSTRACT

A fuel gasifier for an internal combustion engine having a gasification chamber, a device for injecting fuel into the chamber in droplets of about 30–50 microns or less in diameter, an ambient air inlet to the chamber with a flow control therefor, to admit a controlled amount of ambient air to mix with the fuel, a heater in the chamber to elevate the fuel temperature and convert the fuel to a gaseous state, a fuel and air mixing and transfer impeller in the chamber for increasing turbulence and propelling the mixture from the chamber, an annular venturi flow passage for flow of additional ambient air past the outside of the chamber, and a plurality of radial passages between the chamber and the venturi passage for flow of the turbulent mixture into the venturi passage and entrainment of the fuel and air mixture into the additional ambient air.

15 Claims, 1 Drawing Sheet

CARBURETION SYSTEM

BACKGROUND OF THE INVENTION

This invention relates to a fuel gasifier for an internal combustion engine.

Various devices have been proposed to improve, augment or replace the carburetor for internal combustion engines, in efforts to increase fuel combustion efficiency. Representative ones of these devices are believed set forth in the following U.S. patents, arranged in inverse chronological order:

| U.S. Pat. No. | |
| --- | --- |
| 4,870,249 | Kayanuma et al |
| 4,637,365 | Yunick |
| 4,538,583 | Earl |
| 4,438,750 | Sviridov et al |
| 3,667,436 | Reichhelm |
| 1,627,671 | Shore |
| 1,311,532 | Schmid |
| 504,723 | Gray |

U.S. Pat. No. 4,870,249 discloses an electric heater for fuel at the carburetor. U.S. Pat. No. 4,637,365 discloses a carburetor system employing a fuel vaporizer, a homogenizing turbine, and a heater. U.S. Pat. No. 4,538,583 discloses a two stage evaporator with the upper chamber forming an expansion chamber, the fuel being heated by impingement on a thermal disc. U.S. Pat. No. 4,438,750 discloses a fuel injector for each cylinder, the fuel being heated by exhaust gases. U.S. Pat. No. 3,667,436 discloses use of electric heat and exhaust gas heat to preheat the fuel. U.S. Pat. Nos. 1,627,671 and 504,723 disclose heating fuel with exhaust gases. U.S. Pat. No. 1,311,532 discloses electrically heating the fuel in a carburetor. At least some of these devices are considered dangerous due to the potential for an explosion in the carburetor in the event of engine backfire. Some are highly complex.

Hence, although many high efficiency, fuel utilization systems have been proposed over the decades, none is believed to have been successfully marketed, in spite of high fuel costs and periodic fuel shortages. Most internal combustion engines in use are so inefficient that they require catalytic converters to cause further combustion of noxious, partially combusted gases to a level below legally acceptable limits. The usual maximum air to fuel ratio is about 14.7 to 1.

SUMMARY OF THE INVENTION

An object of this invention is to provide a fuel gasification system capable of achieving excellent fuel usage efficiency, with noxious gas output considerably below legally acceptable amounts for the specific test vehicle, without the necessity of a catalytic converter. Testing of the novel apparatus has demonstrated greatly improved efficiency over known systems, and surprisingly low levels of noxious gases, considerably below that normally achieved even with the use of catalytic conversion. Liquid combustion fuel is introduced into a special gasification chamber in the form of tiny droplets about 30-50 microns or less in diameter, mixed with a first portion of ambient air and heated to convert the liquid fuel to a gas and form a turbulent heated gaseous fuel and air mixture which is then entrained into the remaining portion of ambient air. The resulting combustible gas mixture is introduced to the engine.

The fuel gasification chamber into which the tiny droplets of fuel are injected, and into which the first portion of ambient combustion air is introduced, creates a turbulent heated fuel-air gas mixture. The chamber not only has a heater to elevate the mixture temperature for gasification of the fuel, but also an impeller which increases mixture of the gaseous fuel and air, increases turbulence of the gas mixture, and assists in propelling the mixture through a series of peripheral outlets to an annular venturi conduit around the chamber. Another portion of ambient combustion air flows rapidly through the annular venturi conduit, entraining the mixture into this other portion of combustion air. An implosion causing backfire from the engine basically would bypass the gasification chamber, as has been shown in experimentation.

These and other objects, advantages and features of the invention will be apparent upon studying the following detailed description.

BRIEF DESCRIPTION OF THE DRAWING

The figure is a sectional, elevational view of the novel fuel gasifier for an internal combustion engine.

DESCRIPTION OF THE PREFERRED EMBODIMENT

Figure 1:
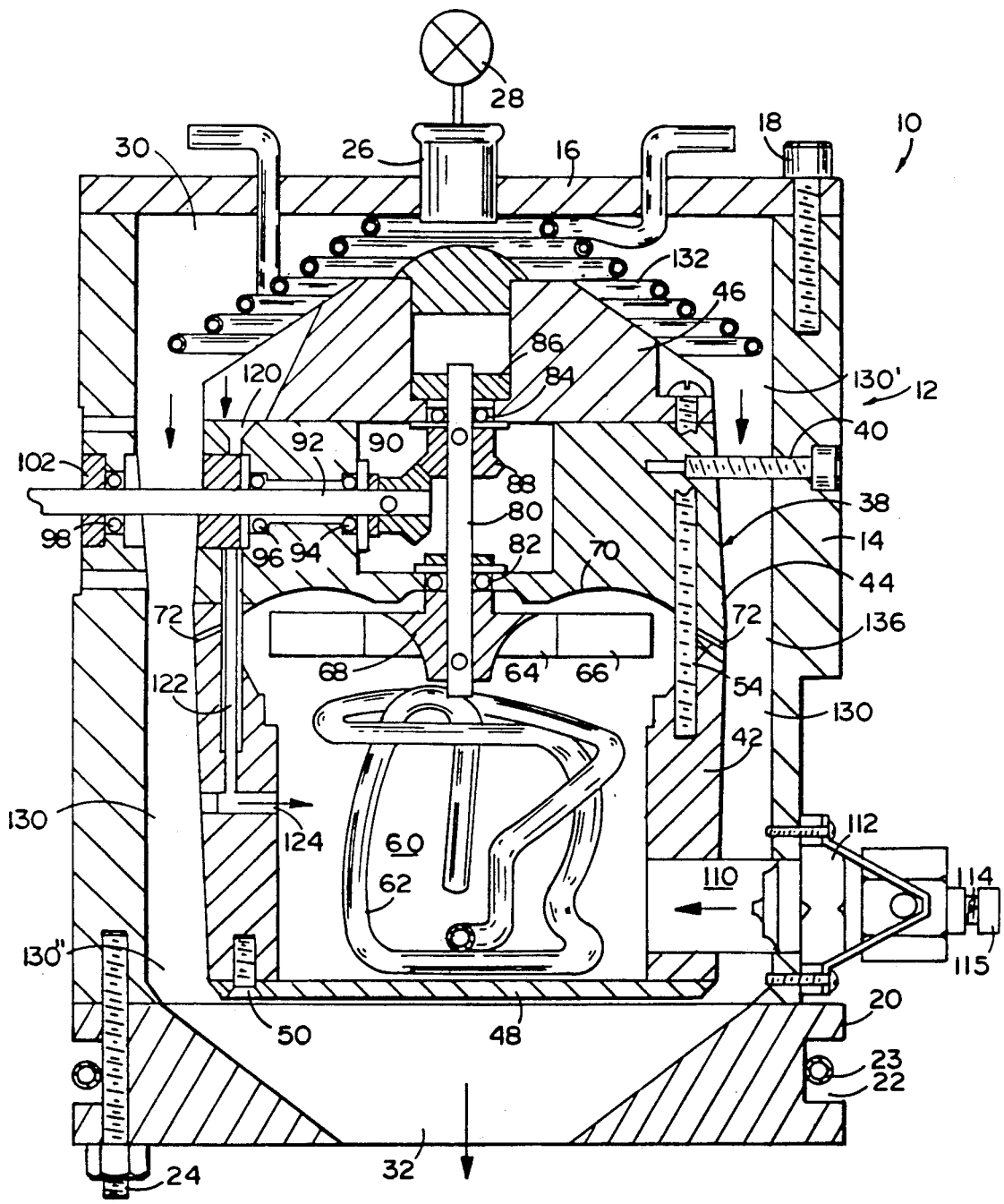

Referring now specifically to the drawing, the fuel gasifier 10 is shown to include an outer housing 12 formed from a generally cylindrical body 14 defining the periphery of the housing, having an upper end cover 16 mounted over the open upper end of housing body 14 and attached to the body by Allen bolts 18 or the equivalent, and an adapter plate 20 over the open lower end of body 14 and attached to the body by suitable bolts 24 or the equivalent. Plate 20 is shown to have a peripheral recess 22 containing a heater 23.

In the upper end of housing 12 is at least one ambient air inlet 26. Upstream of inlet 26 is a control valve 28 (shown schematically) which enables control of the amount of ambient air flow to the system. This valve allows ambient air flow from the exterior of the gasifier into housing 12, and specifically the upper chamber 30 formed by the outer housing. In the lower end of the housing, specifically in the center of plate 20, is a tapered outlet opening 32 for conducting the combustible gas mixture generated by the fuel gasifier down to an internal combustion engine (not shown).

Within outer housing 12 is an inner housing 38 spaced from the inner wall of outer housing 12 and held in this spaced relationship as by a plurality of bolts 40 therebetween, around the periphery of the two housings. Inner housing 38 is shown to be formed of four main components, namely a lower, generally cylindrical body 42, an upper body 44 attached to lower body 42, an upper cap 46 mounted on member 44, and a bottom cover 48 mounted on the open lower end of inner body member 42 as by screws 50. Elements 42, 44 and 46 can be secured together by a plurality of elongated threaded screws or bolts 54.

Inner housing 38 forms a gasification chamber 60 in the lower portions thereof. Within chamber 60 is a heater element 62, shown in the preferred form to comprise a liquid conducting heating coil for conducting liquid, preferably engine coolant, heated to a temperature substantially above ambient. It has been determined that the fuel droplets in the chamber need additional heat of vaporization to bring about gasification. The heater coil is here shown to have a random configuration. Also within chamber 60, preferably at the top thereof, is a rotational impeller 64 having a plurality of radial blades 66 around a hub 68. The blades are configurated to draw the gas mixture upwardly and change the flow direction about 90° for propelling the gaseous mixture radially outwardly. The top of chamber 60 preferably has an annular concave dome 70 in member 44 above the impeller. The impeller increases turbulence in the chamber to optimize mixing of the ambient air and the gaseous fuel. The impeller draws the gaseous mixture upwardly in the chamber, and then propels the gas mixture in a radially outward flow direction toward a plurality of radial outlet passages 72. These outlet passages are at spaced intervals around the periphery of the chamber, extending through component 42 of housing 38 into an annular venturi flow path 130 through which another portion of ambient air flows, and to be further described hereinafter. In the present preferred embodiment, there are twenty outlets equally spaced around the periphery, and each of about one-sixteenth inch diameter. Any gases that move to the space between the impeller and the dome 70 are directed downwardly and outwardly to outlets 72 by the concave dome.

An impeller which has been found effective is a ROTON brand, Model 3501-1, obtained from FHA, Inc., National City, Calif., optionally downsized to a three and one-quarter inch diameter, with a capacity of about 22 SCFM at 6800 RPM. Impeller 64 is mounted on a vertical rotational drive shaft 80 which extends upwardly to a drive mechanism for the impeller. Shaft 80 is mounted on suitable spaced bearings 82 and 84, with a seal 86 on the upper end of shaft 80. In the embodiment depicted, the drive system extends laterally into the apparatus. That is, mounted on shaft 80 is a bevel spur gear 88 which is engaged by another bevel spur gear 90 on a horizontal shaft 92 extending through the two housings, supported on bearings 94, 96 and 98, having a seal 100 therearound in the wall of housing 38, and a seal 102 therearound in the wall of housing 12. A suitable electric motor, air motor, or other motor drive (not shown) is attached to shaft 92 to drive these components and thereby operate impeller 64. An alternative to this side drive mechanism for impeller 64 is a vertical drive down through the top of the housing, thereby eliminating gears 88 and 90 and shaft 92. That is, the drive shaft 80 could extend up through the two housings to a suitable drive motor. Operation of the impeller adds some pressure to the gas in the chamber, typically about 9% of the total pressure differential.

Referring again to gasification chamber 60, a fuel inlet passage 110 extends through both housings 12 and 38 from the exterior thereof. Extending into inlet passage 110 is a device for introducing the tiny droplets of fuel, about 30-50 microns or less in diameter. Illustrated here is an atomizer nozzle 112 which receives a controlled flow rate of liquid fuel such as gasoline through a inlet conduit 114 and ejects the fuel under pressure through inlet 110 and into chamber 60 in the form of the tiny droplets. A small amount of air is employed to assist in the ejection. The flow rate of fuel is controlled by an input control valve 115 on conduit 114. Preferably, the air duct and the fuel conduit are also equipped with shutoff valves, e.g., solenoid valves, for rapid shutoff when desired. In tests run on the invention, fuel nozzle pressures were within the range of 8 to 40 psig, using a standard, commercially available nozzle, e.g., "Delevan" Model AL1 nozzle, England. If desired, this nozzle injector can be substituted by another type of injection means, provided the fuel is injected in the form of the tiny droplets. A noted previously, the fuel is injected into gasification chamber 60 where it is mixed with a controlled portion of drawn-in ambient air. This portion of ambient air is drawn, by the combination of impeller 64 and engine vacuum, through inlet 120 in inner housing member 44 and therefrom through an elongated passage 122 extending through members 44 and 42 and from thence through transverse passage 124 into chamber 60. The turbulent heated gaseous mixture of fuel and ambient air is moved by a pressure differential caused by engine vacuum and ambient air-venturi suction action in passage 130, assisted by positive pressure of impeller 64. The mixture is directed radially outwardly and slightly downwardly through the plurality of radial passages 72 into the annular venturi passage 130 through which the other portion of the controlled amount of ambient air introduced into the outer housing flows. This ambient air entrains the mixture as explained more fully below.

In the top of chamber 30 is an optional heating coil 132 to raise the temperature of the ambient air introduced into the structure. Below this coil, around inner housing 38 and within outer housing 12, is the elongated annular passage 130 which converges from a wider, annular cross sectional area inlet 130', tapering gradually to the most constricted neck zone 136 just above the outlet of passages 72 and then diverging gradually to the discharge end 130" to outlet 32 from the gasifier. The venturi flow through this annular passage causes velocity increase and pressure decrease of the flowing ambient air at the restricted neck 136 to thereby assist in drawing the heated mixture into the venturi passage. The heated gaseous fuel and ambient air mixture is entrained by and mixes with the portion of ambient air flowing through passage 130, to form the final combustion mixture for the engine.

In operation, heat is supplied from an external source such as the engine coolant, through heating coil 62 and optionally through coil 132. Impeller 64 is rotated from an external motor source such as an electric motor, an air motor or the like. Heater 23, such as a resistance heater or liquid heater coil, is preferably activated to keep the fuel and air mixture above 140° F. Fuel is injected into gaseous chamber 60 through inlet 110 by an injector, preferably a nozzle 112, under pressure, to produce tiny droplets 30-50 microns or smaller in diameter, preferably smaller than 30 microns in diameter. Simultaneously, a controlled amount of ambient air is steadily drawn through inlet 120 from chamber 30 down through passageways 122 and 124 into chamber 60, where the fuel and ambient air are mixed under turbulent conditions, and simultaneously heated to gasify the fuel, and thus form a heated, turbulent gaseous mixture. This mixture is propelled from chamber 60, moving through outlets 72 into air flowing through the annular venturi passage 130. The controlled quantity of ambient air rushing through annular passage 130 dilutes the fuel and air gaseous mixture to a final air to fuel ratio substantially above present ratios, registering on the test unit at the upper limit of the meter used for meeting E.P.A. standards, i.e., in the range of about 32.7 to 1. It is believed that the ratio was greater than this, but it could not be measured with standard test equipment. The gaseous mixture has proven to effectively and efficiently drive conventional vehicles such as a pickup truck.

This novel fuel gasifier has been substituted for conventional carburetors on different size, type and model vehicle engines under experimental testing conditions and has demonstrated a marked increase in fuel utilization. while emitting gases which are a great deal below federal government standards, even though a catalytic converter was not used.

During operation, the air and fuel mixture first flows upwardly in the gasification chamber, and then its flow direction is changed to outwardly and then downwardly, such that the apparatus can be relatively short in height. The rate of air flow to the gasifier is controlled by valve 28 and the rate of fuel flow is controlled by a valve 115 on fuel line 114. A small amount of ambient air is also introduced through nozzle 112 in order to vaporize the fuel. However, this amount is only a negligible fraction of the total air present.

Illustrative operating parameters and results of tests run on a GMC pickup 250 C.I.D. in line 6 cylinder, 3 speed automatic transmission, employing a Datec dynamometer from Michigan Auto Test, Kalamazoo, Michigan, and measured on an Allen Test Products E.P.A. Test Unit, Cleveland, Ohio, are as follows:

| I. | | |
|---|---|---|
| Air/Fuel Ratio | 32.7:1 | |
| RPM | 1439 | |
| Torque | 255 | Ft. Lb. |
| Engine Vacuum | 17 | In. Hg. |
| Horsepower | 98 | |
| MPH | 39 | |
| Exhaust Gas Analysis: | | |
| Carbon Dioxide | 11.2% | |
| Carbon Monoxide | 0.2% | |
| Hydrocarbons | 55 | PPM |
| II. | | |
| Air/Fuel Ratio | 32.4:1 | |
| RPM | 1502 | |
| Torque | 254 | Ft. Lb. |
| Engine Vacuum | 17 | In. Hg. |
| Horsepower | 105 | |
| MPH | 42 | |
| Exhaust Gas Analysis: | | |
| Carbon Dioxide | 11.4% | |
| Carbon Monoxide | 0.19% | |
| Hydrocarbons | 54 | PPM |
| III. | | |
| Air/Fuel Ratio | 32.2:1 | |
| RPM | 1296 | |
| Torque | 259 | Ft. Lb. |
| Engine Vacuum | 16 | In. Hg. |
| Horsepower | 94 | |
| MPH | 39 | |
| Exhaust Gas Analysis: | | |
| Carbon Dioxide | 11.7% | |
| Carbon Monoxide | 0.14% | |
| Hydrocarbons | 105 | PPM |
| IV. | | |
| Air/Fuel Ratio | 31.3:1 | |
| RPM | 1412 | |
| Torque | 225 | Ft. Lb. |
| Engine Vacuum | 15 | In. Hg. |
| Horsepower | 95 | |
| MPH | 38 | |
| Exhaust Gas Analysis: | | |
| Carbon Dioxide | 11.6% | |
| Carbon Monoxide | 0.14% | |
| Hydrocarbons | 91 | PPM |
| V. | | |
| Air/Fuel Ratio | 31.5:1 | |
| RPM | 1479 | |
| Torque | 254 | Ft. Lb. |
| Engine Vacuum | 16 | In. Hg. |
| Horsepower | 98 | |
| MPH | 39 | |
| Exhaust Gas Analysis: | | |
| Carbon Dioxide | 11.5% | |
| Carbon Monoxide | 0.18% | |
| Hydrocarbons | 85 | PPM |

It is apparent from results such as these that the air to fuel ratio is increased dramatically over that experienced with known state-of-the-art apparatus. Also, the power output is markedly increased. Moreover, it was determined that the combustion gaseous outflow contained far less noxious carbon monoxide and hydrocarbons than minimums required by law and enforced by the Environmental Protection Agency.

The speed of the engine can be varied by a throttle which varies the flow rate of ambient air to the gasifier, using valve 28. Preferably, the flow rate of fuel input is also varied, using valve 115. Optionally, both are varied simultaneously as with a computer control, programmed to achieve a desired relationship between effective power output and efficient air to fuel ratio. It is significant that input of both air and fuel is regulated.

Conceivably, certain minor variations may be made on the disclosed apparatus without departing from the concept set forth herein. Hence, the invention is not intended to be limited to the preferred illustrative embodiment set forth, but only by the scope of the appended claims and the reasonable equivalents thereto.

The embodiments of the invention in which an exclusive property or privilege is claimed are defined as follows:

1. A fuel gasifier for an internal combustion engine comprising:
   a gasification chamber;
   a liquid fuel inlet to said chamber;
   a fuel injection means at said liquid fuel inlet having the capability for injecting tiny droplets of liquid combustion fuel of about 30-50 microns or less in diameter through said inlet into said chamber;
   means for introducing ambient air to said chamber to mix with said droplets and form a mixture of fuel droplets and ambient air
   a heater in said chamber of sufficient capacity for heating said mixture of fuel droplets and ambient air adequately to convert said fuel to a gaseous state;
   a fuel and air mixing and transfer impeller in said gasification chamber for further mixing of said ambient air and gaseous fuel, increasing the turbulence of said gaseous mixture and assisting propulsion of said mixture from said chamber;
   an air flow venturi conduit having an ambient air flow inlet, and having an outlet for flow to the engine; and
   outlet passages from said gasification chamber to said air flow venturi conduit for entrainment of said gaseous mixture into additional ambient air flowing through said venturi conduit to said outlet.

2. The fuel gasifier in claim 1 wherein said venturi conduit is annular and extends around said gasification chamber, and said outlet passages are radially oriented and positioned around said gasification chamber at spaced intervals.

3. The fuel gasifier in claim 2 wherein said impeller is arranged to move the gaseous fuel and ambient air mixture up and then outwardly into and through said outlet passages.

4. The fuel gasifier in claim 2 wherein said chamber has a top and a bottom;
said fuel injection means and said means for introducing ambient air are adjacent the bottom of said chamber;
said impeller is adjacent the top of said chamber; and
said impeller is configured to draw the injected fuel and ambient air upwardly and then propel the fuel and ambient air outwardly through said outlet passages to said venturi conduit.

5. The fuel gasifier in claim 4 wherein said venturi passage is oriented downwardly to cause said additional ambient air to flow downwardly past said passages.

6. The fuel gasifier in claim 2 including an ambient air control valve for regulating the rate of ambient air inlet to said gasifier.

7. A fuel gasifier for an internal combustion engine, comprising:
an outer housing having an ambient air inlet, and having a flow outlet for flow of a fuel and air mixture to an internal combustion engine;
an inner housing within said outer housing and spaced therefrom to define an annular ambient air flow passage for one portion of ambient air from said ambient air inlet to said flow outlet;
said inner housing defining a gasification chamber;
a liquid fuel inlet to said gasification chamber and liquid fuel injection means at said inlet for injecting tiny droplets of liquid fuel of about 30-50 microns in diameter or less into said gasification chamber to form a fuel and air mixture;
a heater in said gasification chamber for elevating the temperature of said fuel sufficiently to convert it to a gas;
ambient air inlet means to said gasification chamber for inflow of a portion of combustion air to said chamber to mix with said fuel;
a plurality of outlet passages around said gasification chamber to said annular, ambient air flow passage; and
a propulsion impeller in said gasification chamber for producing turbulence in said mixture and assisting in propelling said mixture through said outlet passages to said annular air flow passage to be entrained in ambient air flowing through said annular passage and thence to said flow outlet.

8. The fuel gasifier in claim 7 wherein said annular passage has a restricted cross section adjacent said outlet passages to form a venturi for assisting entrainment of said mixture of fuel and air into ambient air flowing through said annular passage.

9. The fuel gasifier in claim 8 wherein said chamber has said propulsion impeller adjacent the top thereof for increasing turbulence, drawing said mixture up in said gasification chamber, and assisting in propelling said mixture through said outlet passages.

10. The fuel gasifier in claim 8 wherein said chamber has a concavely curved dome.

11. A fuel gasifier for an internal combustion engine comprising:
an ambient air inlet to said gasifier;
an air flow control valve for said ambient air inlet;
a gasification chamber;
a liquid fuel inlet to said chamber;
a fuel injection means at said liquid fuel inlet having the capability for injecting tiny droplets of liquid combustion fuel through said inlet into said chamber;
a fuel flow rate control means for said fuel injection means for controlling the flow rate therefrom;
means for introducing ambient air from said ambient air inlet to said chamber to mix with said droplets and form a mixture of fuel droplets and ambient air;
ambient air flow control means for said means for introducing ambient air, for controlling the flow therethrough;
a heater in said chamber of sufficient capacity for heating said mixture of fuel droplets and ambient air adequately to convert said fuel to a gaseous state;
a fuel and air mixing and transfer impeller in said gasification chamber for further mixing of said ambient air and gaseous fuel, increasing the turbulence of said gaseous mixture and propelling said mixture from said chamber;
an air flow venturi conduit having an ambient air flow inlet, and having an outlet for flow to the engine; and
outlet passages from said gasification chamber to said air flow venturi conduit for entrainment of said gaseous mixture into additional ambient air flowing through said venturi conduit to said outlet.

12. The fuel gasifier in claim 11 wherein said venturi conduit is annular and extends around said gasification chamber, and said outlet passages are radially oriented and positioned around said gasification chamber at spaced intervals.

13. The fuel gasifier in claim 12 wherein said chamber has a top and a bottom;
said fuel injection means and said means for introducing ambient air are adjacent the bottom of said chamber;
said impeller is adjacent the top of said chamber; and
said impeller is configured to draw the injected fuel and ambient air upwardly and then propel the fuel and ambient air outwardly through said outlet passages to said venturi conduit.

14. The fuel gasifier in claim 13 wherein said venturi passage is oriented downwardly to cause said additional ambient air to flow downwardly past said passages, whereby the air and fuel mixture first flows upwardly, then outwardly, and then downwardly.

15. A fuel gasifier for an internal combustion engine, comprising:
an outer housing having an ambient air inlet, and having a flow outlet for flow of a fuel and air mixture to an internal combustion engine;
an air flow control valve for said ambient air inlet;
an inner housing within said outer housing and spaced therefrom to define an annular ambient air flow passage for one portion of ambient air from said ambient air inlet to said flow outlet;
said annular ambient air flow passage having a venturi configuration including a restricted neck portion;
said inner housing defining a gasification chamber;
a liquid fuel inlet to said gasification chamber and liquid fuel injection means at said inlet for injecting tiny droplets of liquid fuel of about 30-50 microns in diameter or less into said gasification chamber to form a fuel and air mixture;
a heater in said gasification chamber for elevating the temperature of said fuel sufficiently to convert it to a gas;

ambient air inlet means to said gasification chamber for inflow of a second portion of ambient air to said chamber to mix with said fuel;

a plurality of radially oriented, circumferentially arranged and spaced outlet passages around said gasification chamber to said restricted neck portion of said annular, ambient air flow passage; and a propulsion impeller in said gasification chamber for producing turbulence in said mixture and assisting in propelling said mixture through said outlet passages to said annular air flow passage to be entrained in ambient air flowing through said annular passage and thence to said flow passage.

* * * * *